United States Patent [19]

Zasloff

[11] 4,321,870

[45] Mar. 30, 1982

[54] CONTROLLING INK DIFFUSION IN WATERCOLOR COPYING

[76] Inventor: Barbara S. Zasloff, 14431 Woodcrest Dr., Rockville, Md. 20853

[21] Appl. No.: 106,006

[22] Filed: Dec. 21, 1979

Related U.S. Application Data

[63] Continuation-in-part of Ser. No. 10,490, Feb. 8, 1979, abandoned, Continuation-in-part of Ser. No. 36,296, May 7, 1979, abandoned.

[51] Int. Cl.$^3$ .......................... B41M 5/06; C08L 5/12
[52] U.S. Cl. .................................. 101/473; 106/14.5; 106/19; 106/208; 428/914; 252/316
[58] Field of Search ........................ 106/14.5, 19, 208; 101/473; 428/914; 264/17.4 ST; 252/315, 316

[56] References Cited

U.S. PATENT DOCUMENTS

| | | | |
|---|---|---|---|
| 478,892 | 7/1892 | Schwartz | 106/14.5 |
| 1,386,995 | 8/1921 | Dorel | 106/14.5 |
| 2,013,584 | 9/1935 | Schwanhausser | 106/19 |
| 2,294,429 | 9/1942 | Stutz | 106/208 |
| 2,677,700 | 5/1954 | Jackson | 106/208 |
| 2,893,890 | 7/1959 | Harvey | 428/914 |
| 3,336,244 | 8/1967 | Rockoff | 260/2.5 |
| 3,506,749 | 4/1970 | Weissman | 264/102 |
| 3,559,576 | 2/1971 | Vrancken | 101/450 |
| 3,853,797 | 12/1974 | Pelzig | 260/17.4 ST |

*Primary Examiner*—Clyde I. Coughenour
*Attorney, Agent, or Firm*—Fidelman, Wolffe & Waldron

[57] ABSTRACT

A method for limiting the diffusion of ink through a planographic plate comprising a polymetric matrix containing liquid, as for example an agar matrix, is described. Incorporated in the matrix is a diffusion inhibitor which has a binding affinity for the water soluble dye comprising the ink. The additives are cationic or anionic surfactants and the dyes employed are anionic or cationic. When an anionic surfactant a cationic dye is used and vice-versa.

9 Claims, No Drawings

CONTROLLING INK DIFFUSION IN WATERCOLOR COPYING

RELATED INVENTIONS

This invention is a continuation-in-part of my prior application Ser. Nos. 10,490 and 36,296 filed Feb. 8, 1979 and May 7, 1979 respectively, now abandoned, which are included herein by reference.

BACKGROUND OF THE INVENTION

This invention relates to a system for producing monocolor or multicolor prints from a printing plate employing inks which are absorbed by the plate and wherein subsequent ink diffusion in the plate is limited.

SUMMARY

The present invention is directed to a method for limiting the diffusion of ink through a planographic plate comprising a polymeric matrix and more specifically, through the agar matrix of the printing plate described in my parent case Ser. No. 10,490. This is accomplished by incorporating in the matrix during its preparation a diffusion inhibitor comprising an additive which has a binding affinity for the water soluble dye comprising the ink.

Such additives are selected from among the classes of cationic or anionic surfactants, depending on the structure of the dye being considered. In general, a cationic surfactant will restrict diffusion of an anionic dye, while an anionic surfactant will act similarly with cationic dyes. Appropriate classes of cationic surfactant include: straight chain quaternary alkylammonium compounds, such as cetyl pyridinium chloride; polymeric cationic surfactants, such as polyvinylmethylpyridinium bromide. Appropriate classes of anionic surfactant include: alkyl sulfates and sulfonates, such as sodium dodecyl sulfate and sodium dioctyl sulfosuccinate; alkylaryl sulfonates, carboxylic acid alkali salts, such as sodium desoxycholate and sodium soaps.

While the process employing the agar printing plate described in my parent case yields satisfactory results, a degree of diffusion of ink through the matrix occurs, resulting in some increase of line width, producing prints of lesser clarity. Continuation-in-part application Ser. No. 36,296 describes one method of limiting diffusion—the addition of water soluble proteins. The method being described here, as opposed to the protein additives require no elaborate packaging process to assure sterility, and will not render the agar plate vulnerable to bacterial growth or mold. While this previous method is satisfactory, it is subject to some practical drawbacks which may limit its use under certain conditions. Also the cost of the additives described here tend to be less than that of the protein additives.

The main object of this invention is to provide a method of planographic printing employing an agar plate, wherein the diffusion of the dyes employed in inks are significantly reduced or substantially prevented by incorporating additives in the plate which have an affinity for said dyes, and which are relatively inexpensive, and which do not render the agar plate vulnerable to growth of microorganisms, thereby avoiding expensive packaging.

DESCRIPTION OF THE INVENTION

Parent application Ser. No. 10,490 describes a planographic plate comprising a rigid gel polymeric matrix containing a liquid therein. Monocolor or multicolor prints are produced by placing graphic designs on the plate surface, as by direct drawing thereon or by a transfer process, using an ink comprising a dye soluble in the liquid, and thereafter contacting the plate with an adsorptive surface to transfer the ink thereto. The plate is preferably formed from a polysaccharide gel such as agar, carrogeenan or furcellaran, collectively termed herein as agar materials. Additives such as pigment, salts, and the like may be incorporated in the gel to impart color, adjust pH and ionic strength and to serve as preservatives.

One limitation of the invention described in the parent case is that the inks employed have a tendency to diffuse through the plate matrix. Prints made at a later time are not as distinct as the earlier prints from the same plate due to increase of line widths as a results of the diffusion. Even though the extent of diffusion may not be large, it can affect the clarity of certain prints.

I have discovered that the addition to the matrix of compositions having a high binding affinity for the dyes comprising the inks will limit this diffusion and result in greatly increased sharpness in later prints taken from the printing plate. These additives include the broad class of organic compounds known as surfactants or detergents, compounds which display both hydrophobic and hydrophilic interactions. The particular class of surfactant, anionic or cationic, is chosen depending on the molecular structure of the dye for which limitation of diffusion is desired. In general a cationic surfactant is added to the matrix composition to restrict diffusion of anionic dyes; conversely, an anionic surfactant is added to the printing plate, to limit diffusion of cationic dyes.

In the preferred agar printing plate, additives of the class of cationic surfactants include, but are not limited to, quaternary alkylaryl ammonium compounds such as cetyl trimethyl ammonium bromide, quaternary alkylaryl ammonium compounds such as benzalkonium chloride; cyclical quaternary ammonium compounds such as cetylpyridinium chloride; polymeric cationic surfactants, such as polyvinylmethylpyridinium bromide. Additives of the class of anionic surfactants include, but are not limited to, alkyl sulfates and sulfonates, such as sodium dodecyl sulfate and sodium dioctyl sulfosuccinate; alkylaryl sulfonates, such as sodium alkyl benzene sulfonate; alkylaryl sulfates, alkali salts of carboxylic acids, such as sodium desoxycholate and sodium salts of higher fatty acids.

The concentration of the additive may vary rather widely. In general, a range of from about 0.02 to 1.0% weight/volume will be satisfactory.

I have found that crystals of the ionic detergents are formed in the matrix when the prepared plate is stored for a period of time, at least several weeks. Also, the rate of crystal formation is affected by temperature. This does not affect the utility of the plate if used within a relatively short time after plate formation. Even after crystals appear, the plate is 100% useable if none are on the surface. Should crystals appear on the plate surface, the plate is useable but the sharp clarity of the prints may be affected. For some uses, such as printing reproduction, the results may still be adequate.

To inhibit crystallization of the ionic surfactant within the matrix a nonionic detergent such as alkylaryl polyether alcohol (Triton X-100), polyoxyethylene(20) sorbitan monopalmitate (Tween 40), or polyoxyethylene lauryl ether (Brij 35) at a concentration approximately equal to that of the ionic detergent is added to the composition.

The following example shows the preparation of a printing plate with an additive to control diffusion.

EXAMPLE 1

(a) Mix 5 grams of sodium chloride, 0.5 grams of sodium EDTA and 20 grams of agar agar powder (USP/FCC, 100 mesh, Gracillaria) into 1000 ml. of water at room temperature (20° C.).

(b) Stir until the suspension is evenly dispersed.

(c) Bring the agar into solution by heating the mixture to 85°–90° C. and maintaining at this temperature for about 5 minutes with intermittent stirring.

(d) Add 7.5 ml. of 20% Triton X-100 (weight/volume in water) and stir.

(e) Add 7.5 ml. of 20% cetyl pyridinium chloride (weight/volume in water) with stirring, producing a fine milky suspension.

(f) Antifoam A Emulsion (Dow Corning, Silicon Defoamer) is added to disperse surface bubbles (several drops).

(g) Several drops of a 1% solution of sodium hydroxide are added to adjust the pH of the suspension to about 8.5.

(h) Depending upon the manner by which the gel will be ultimately packaged the solution can be poured immediately into a mold, or can be cooled to as low as approximately 45° C. prior to pouring. Gelling occurs within approximately 5 minutes at room temperature and proportionately more rapidly at cooler temperatures.

EXAMPLE 2

A comparison test was made to show the rate of diffusion of dyes in agar plates with and without diffusion inhibitors. Lines of about 3 mm in width were drawn with a dye solution on an agar plate prepared as in Example 2 of my parent application Ser. No. 10,490. This plate does not contain a diffusion inhibitor. The dyes employed were FD&C Red 3 and malachite green (CI 42000). FD&C Red 3 is an anionic dye, while malachite green is cationic. One gram of each powdered dye was dissolved separately into 2 ml. of water and then filtered. Similar lines were drawn with both dyes on the plate without additive, the plate described in the above example herein, containing cetylpyridinium chloride, and on a plate containing sodium dodecyl sulfate. The width of the lines at various time intervals were as follows:

| Time lapse in minutes | Line width in mm no inhibitor | | Line width in mm plus cetyl pyridinium chloride | | Line width in mm plus sodium dodecyl sulfate | |
|---|---|---|---|---|---|---|
| | Red #3 | Malachite Green (M.G.) | Red #3 | M.G. | Red #3 | M.G. |
| 0 | 3 | 3 | 3 | 3 | 3 | 3 |
| 30 | 5 | 5 | 3 | 5 | 5 | 3 |
| 60 | 7 | 7 | 3 | 7 | 7 | 3.5 |
| 90 | 9 | 9 | 3 | 9 | 9 | 4 |

Thus, the diffusion of the anionic dye Red #3 is decreased upon addition of the cationic surfactant cetylpyridinium chloride to the agar printing plate composition; the diffusion of the cationic dye malachite green is reduced by inclusion of the anionic surfactant, sodium dodecyl sulfate, into the printing plate composition.

Similar comparative results are achieved with the agar plates of the other examples in the parent application.

It is apparent that prints of suitable quality may be obtained using the agar plate of my parent application Ser. No. 10,490 providing they are made shortly after the plate is inked. Adding the cetylpyridinium chloride or the sodium dodecyl sulfate inhibitor (depending upon the set of dyes employed) enables the time for making good quality prints to be considerably extended.

Without wishing to be bound to any theory, it is believed that these adsorptive materials exhibit a significant affinity for the molecules of the dyes employed as inks. From the nature of the surfactant and dye interactions which result in optimal limitation of diffusion, namely, cationic surfactants restrict diffusion of anionic dyes, while anionic surfactants restrict cationic dye diffusion, electrostatic or ionic interactions clearly participate in the mechanism of surfactant dye affinities. The molecules of the surfactants are either bound to the polymeric matrix by adsorptive (hydrophobic) interaction, or are trapped as large micellar aggregates within the matrix pores. Dye applied to the surface of the matrix diffuses into the gel and binds to surfactant molecules trapped within or adherent to the matrix. Ink transfer is effected by water flux from the gel, resulting in the coincident transport of a fraction of dye molecules free from the matrix at that time. By including in the matrix the adsorptive additives, the rate of diffusion of dyes through the matrix is controlled, and prints of higher line resolution may be obtained.

I claim:

1. A planographic printing plate comprising an agar matrix containing an aqueous liquid and constituting a gel having pores of a size sufficient to prevent migration of dye molecules therethrough, said matrix containing a surfactant selected from the class of anionic or cationic surfactants, wherein the cationic surfactant is a member of the class consisting of quaternary alkylaryl ammonium compounds and polymeric cationic surfactants, the anionic surfactant is a member of the class consisting of alkyl sulfonates, alkyl sulfates, alkylaryl sulfonates, alkylaryl sulfates and alkali metal salts of carboxylic acids, said matrix containing additionally a non-ionic detergent selected from the group consisting of alkylaryl polyether alcohol, polyoxyethylene (20) sorbitan monopalmitate or polyoxyethylene lauryl ether.

2. The printing plate of claim 1 wherein the surfactant is the cationic surfactant cetyl pryidinium chloride.

3. The printing plate of claim 1 wherein the surfactant is the anionic surfactant sodium dodecyl sulfate.

4. A planographic printing plate comprising an agar matrix containing an aqueous liquid and constituting a gel having pores of a size sufficient to prevent migration of dye molecules therethrough, said matrix containing additionally a surfactant selected from the group consisting of anionic or cationic surfactants, said planographic plate having inked lines or designs thereon, said ink comprising a water soluble dye selected from the group consisting of anionic or cationic dyes, wherein when the surfactant is cationic the dye is anionic, and when the surfactant is anionic the dye is cationic.

5. The planographic printing plate of claim 4 wherein the cationic surfactant is a member of the class consisting of quaternary alkylaryl ammonium compounds, cyclical quaternary ammonium compounds and polymeric cationic surfactants and the anionic surfactant is a member of the class consisting of alkyl sulfonates, alkyl sulfates, alkylaryl sulfonates, alkylaryl sulfates and alkali metal salts of carboxylic acids.

6. The planographic plate of claim 5 wherein the surfactant is cetyl pyridinium chloride and the ink comprises FD&C Red 3.

7. The planographic plate of claim 5 wherein the surfactant is sodium dodecyl sulfate and the ink comprises malachite green (CI 42000).

8. The planographic plate of claim 5 wherein the matrix contains a non-ionic detergent.

9. The planographic plate of claim 8 wherein the surfactant is cationic and comprises cetyl pyridinium chloride, the non-ionic detergent comprises alkylaryl polyether alcohol, and the ink comprises the anionic dye FD and C Red 3.

* * * * *